| United States Patent [19] | | [11] Patent Number: 5,045,379 |
|---|---|---|
| Kotani et al. | | [45] Date of Patent: Sep. 3, 1991 |

[54] POLYESTER FILM FOR HIGH DENSITY MAGNETIC RECORDING MEDIUM

[75] Inventors: Tomoyuki Kotani, Machida; Shigeo Utsumi; Kichinojo Tomitaka, both of Yokohama, all of Japan

[73] Assignee: Diafoil Company, Limited, Tokyo, Japan

[21] Appl. No.: 360,544

[22] Filed: Jun. 2, 1989

[30] Foreign Application Priority Data

Jun. 3, 1988 [JP]  Japan .................................. 63-136749
Jun. 13, 1988 [JP]  Japan .................................. 63-145039

[51] Int. Cl.$^5$ ........................ B32B 3/00; B32B 27/00; B32B 27/36
[52] U.S. Cl. .................................... 428/156; 428/220; 428/323; 428/480; 428/900; 428/910
[58] Field of Search ............... 428/480, 900, 910, 220, 428/323, 156

[56] References Cited

U.S. PATENT DOCUMENTS

| 4,489,117 | 12/1984 | Ono et al. ......................... 428/900 X |
| 4,663,209 | 5/1987 | Aonuma et al. .................. 428/900 X |
| 4,670,319 | 6/1987 | Katoh et al. ..................... 428/910 X |
| 4,687,710 | 8/1987 | Ogawa et al. .................... 428/900 X |
| 4,761,327 | 8/1988 | Hamano et al. ................. 428/480 X |

*Primary Examiner*—Thomas J. Herbert, Jr.
*Attorney, Agent, or Firm*—Oblon, Spivak, McClelland, Maier & Neustadt

[57] ABSTRACT

A polyester film suitable for a base of high density magnetic recording medium containing barium ferrite as a magnetic material characterized in that the centerline average roughness (Ra) is not more than 0.025 μm and the $F_5$ value in the longitudinal direction is not less than 14 kg/mm$^2$ is disclosed wherein the polyester film exhibit excellent better durability when used with barium ferrite as a magnetic material.

8 Claims, No Drawings

POLYESTER FILM FOR HIGH DENSITY MAGNETIC RECORDING MEDIUM

FIELD OF THE INVENTION

This invention relates to polyester film suitable for high density magnetic recording media containing barium ferrite as a magnetic material. More particularly, this invention relates to biaxially stretched polyester film having excellent durability and flatness and being suitable for high density magnetic recording media.

BACKGROUND OF THE INVENTION

Polyester films have excellent heat resistance, mechanical properties, chemical resistance, etc., and therefore, are widely used as base films for audio and video recording media. Recently, magnetic recording is rapidly shifting to high density recording and perpendicular magnetic recording has come to be employed. Among the magnetic materials for perpendicular magnetic recording, barium ferrite is attracting attention because of its high density recording characteristics as well as its stability and productivity. For instance, when a digital audio tape (DAT) is duplicated at high speed by contact magnetic transfer method, the duplicated tape must be capable of high density recording of a 0.67 μm wavelength at low coersive force as low as 700 Oe. Magnetic recording tapes using barium ferrite as a magnetic material, which satisfy the above requirements, have now come into practical use.

However, it has been found that magnetic recording media using barium ferrite are inferior in durability to those using γ-ferrite or metal. More specifically, magnetic recording tapes using barium ferrite are susceptible to deformation at edge portions when used over long periods of time.

Also magnetic recording media using barium ferrite are inferior in light-shielding property to those using γ-ferrite or metal. Floppy discs and magnetic tapes are usually positioned properly by detection of an optical positioning hole or tape leader. Therefore, various attempts have been made for providing barium ferrite magnetic media with sufficient light shielding property.

DISCLOSURE OF THE INVENTION

We conducted an intensive study in search of a solution of the aforesaid problems, and found that a base film for magnetic recording media having excellent durability can be obtained by providing polyester film with strength in the longitudinal direction within a limited range and this invention was completed.

This invention provides a polyester base film for high density magnetic recording media in which barium ferrite is used, said base film having a centerline average roughness (Ra) of not more than 0.025 μm, and longitudinal $F_5$ value of not less than 14 kg/mm$^2$.

In the present specification, the term "polyester" means crystalline aromatic polyesters which are prepared by polycondensation of an aromatic dicarboxylic acid such as terephthalic acid, isophthalic acid, naphthalene-2,6-dicarboxylic acid, etc. or an ester thereof and a diol such as ethylene glycol, diethylene glycol, tetramethylene glycol, neopentyl glycol, etc. Typical examples of such polymers are poly(ethylene terephthalate), poly(ethylene 2,6-naphthalate), poly(tetramethylene terephthalate), poly(tetramethylene 2,6-naphthalate), etc. It should be understood that the term encompasses not only polyesters consisting of a repeating unit of a dibasic acid moiety and a glycol moiety but also coplymerized polyesters of which 80% of the repeating units comprise said polyester and the remaining 20% of the repeating units are other monomer or monomers as well as a mixture of said polyesters and other polymer or polymers. It is preferred that a polyalkylene glycol such as polyethylene glycol, polytetramethylene glycol, etc. is copolymerized in order to improve adhesion of the magnetic layer.

When another polymer or polymers are mixed with said polyester, the amount of said polymer or polymers is limited to the extent that the properties of said polyester are not substantially affected. For instance, less than 15% by weight of polyolefin, polyamide, polycarbonate and the like can be added.

The polyesters usable in the present invention should have a limiting viscosity of not less than 0.40, preferably 0.6–0.9, since polyesters of low polymerization degree are inferior in mechanical properties.

The polyester films used in the present invention usually contain inert fine particles in order to be provided with slipperiness. The amount of such inert fine particles to be added is not specifically limited, but it is usually preferred that such particles be contained in an amount of 0.005–2% by weight. Particles having a mean particle size of 0.005–50 μm are preferred. The species of the inert fine particles is not specifically limited. Examples of usable particles are high melting organic compounds which do not fuse when the polyester resin is melted to be formed into a film; so-called internally precipitated particles which are formed in the polyester from metal compound catalysts such as alkali metal compounds, alkaline earth metal compounds used when the polyester is prepared; externally added inert particles such as MgO, ZnO, MgCO$_3$, CaCO$_3$, CaSO$_4$, BaSO$_4$, Al$_2$O$_3$, SiO$_2$, TiO$_2$, SiC, LiF, talc, clay minerals such as kaolin, carbon black, graphite, celite, mica, terephthalate salts of Ca, Ba, Zn, Mn, etc. Also, inert organic compounds such as metal soaps, starch, carboxymethylcellulose (CMC), etc. can be used.

In the present invention, use of carbon black increases the light-shielding property of the film.

Carbon blacks preferred in the present invention are lamp black, thermal black, furnace black, acetylene black, etc. The particle size thereof is not specifically limited, although preferably particles of not larger than 2 μm, more preferably not larger than 1 μm, are used.

When carbon black is incorporated in the film, the content thereof is preferably in a range of 0.05–2 wt%, more preferably of 0.1–0.7 wt%. With less than 0.05 wt%, the light-shielding is not satisfactory, and with more than 2 wt%, the flatness of the film surface is degraded by aggregation of carbon black.

For the improvement of shading property, not only carbon black but also dyes and organic and inorganic pigments can be used in combination insofar as they have no adverse effect on the properties of the film as a base for magnetic recording media. Needless to say, a dispersant can preferably be used for improving dispersion of the light-shielding agent.

Inert fine particles including the light-shielding agents can be added to the polyester at a suitable stage during the preparation of polyester or prior to the melt extrusion of polyester into a sheet.

In the film of the present invention, the centerline average roughness (Ra) should be not larger than 0.025 μm, preferably not larger than 0.012 μm and more preferably not larger than 0.009 μm. If the Ra value of a film is larger than 0.025 μm, magnetic recording media comprising said film and a magnetic layer in which barium ferrite is used as a magnetic material do not exhibit good electromagnetic conversion characteristics.

In the film of the present invention, the $F_5$ value of the film in the longitudinal direction should be not less than 14 kg/mm$^2$, preferably not less than 17 kg/mm$^2$. The reason therefor is that even a thin film must have sufficient mechanical strength and especially a base film for a magnetic layer using barium ferrite must have sufficient strength, since as mentioned above, magnetic recording media using barium ferrite as a magnetic material is inferior in strength to those using γ-ferrite or metal. That is, magnetic recording media made of a base film whose longitudinal $F_5$ value is less than 14 kg/mm$^2$ and barium ferrite as a magnetic material is inferior in mechanical strength and durability.

The transmittance of light of a wavelength of 900 nm by 9 μm thick polyester film of the present invention ($T_{9\ \mu m}^{900nm}$) should preferably be not more than 80%, more preferably not more than 70% and most preferably not more than 65%. If the value is more than 80% at a film thickness of 9 μm, the light-shielding property is insufficient. For films whose thickness is other than 9 μm, the $T_{9\ \mu m}^{900nm}$ value is given in accordance with the following equation:

$$\frac{\log \frac{T_{9\ \mu m}^{9(X)\ nm}}{100}}{9} = \frac{\log \frac{Tx}{100}}{x} \quad (1)$$

wherein x : thickness of film

Tx : light transmittance (%) when the film thickness is x μm $T_{9\ \mu m}^{900nm}$ light transmittance (%) of a 9 μm thick film The film of the present invention should preferably have not more than 80/25 cm$^2$ surface protrusions having a height more than 0.81 μm. That is, the number of surface protrusions higher than 0.81 μm ($N^{0.81\ \mu m}$) should preferably be not more than 80/25 cm$^2$ and more preferably not more than 50/25 cm$^2$. When the $N^{0.81\ \mu m}$ is more than 80/25 cm$^2$, the resulting magnetic recording media are unsatisfactory because the frequency of occurrence of dropout increases.

The film of the present invention is prepared as described below for instance. The preparation method is, however, not limited to this specific mode.

A polyester resin as defined in the above containing a dye, pigment or stabilizer as desired is dried by a conventional means, and extruded into a sheet at a temperature in the range of 260°–320° C., while being filtered by a fine filter of not less than 1000 mesh. The extruded sheet is cooled to a temperature not higher than 80° C. to obtain a substantially amorphous sheet. The film is preferably cooled by the conventionally used electrostatic cooling method. The thus obtained sheet is stretched longitudinally and transversely by a factor of 9 in area, whereby it becomes a biaxially oriented film. The film is further stretched longitudinally or transversely if desired, and finally the film is heat-treated at a temperature in the range of 180°–250° C. In this heat treatment, the film can be relaxed by 0.1–20% in the transverse or longitudinal direction in the highest temperature zone and/or the exit zone of the heat-treating apparatus. The heat treatment can be effected in two steps.

The film can be coated with some colored material after longitudinal stretching and before transverse stretching so as to be provided with light-shielding property.

SPECIFIC DESCRIPTION OF THE INVENTION

The invention will now be illustrated by way of working examples. However, the scope of the technical idea of the invention is not limited by these examples.

Evaluation of characteristics of the prepared films and magnetic recording media was carried out as follows.

(1) Light transmittance ($T_{9\ \mu m}^{900\ nm}$)

Transmittance of 900 nm light, which is near infrared radiation, by an autorecording spectrophotometer ("340" marketed by Hitachi, Ltd.)

(2) Centerline average roughness (Ra)

Centerline average roughness was measured using a surface roughness tester ("SE-3FK" marketed by K. K. Kosaka Kenkyusho) as follows. The radius of curvature of the tip of the contact stylus was 2 μm. Load was 30 mg. From the cross-section curve of a film, a standard length L (2.5 mm) in the direction of the center line was cut out. The center line of this cut out portion was taken as the X-axis and the direction of the thickness (multiplied by a factor of about 50,000) was taken as the Y-axis. Roughness was indicated as y = f(x) in μm. The cut-off value was 80 μm. The Ra value was obtained as the average of those of 5 points in the longitudinal direction and 5 points in the transverse direction (10 points in all). Ra is given as:

$$1/L \int_O^L f(x)\ dx$$

(3) Number of large protrusions ($N^{0.81\ \mu m}$)

Aluminum was vapor-deposited on the surface of a film and the surface was observed by means of a double beam interference microscope. Light of a wavelength of 0.54 μm was employed. The number of protrusions which produced interference fringes of the third or higher orders was measured and converted to a number per 25 cm$^2$. The term "large protrusions" means those having height of not less than 0.81 μm.

(4) $F_5$ value

A film specimen having a width of ½ inch and a length of 50 mm between the two chucks was pulled by a tension tester ("Tensilon UTM-III" marketed by Toyo Measuring Instrument Co.) at a range of 50 mm/min at 20° C. in a 65% RH atmosphere. The load at 5% elongation was measured and divided by the initial cross-sectional area and expressed in kg/mm$^2$.

(5) Optical signal detection

A magnetic coating composition containing barium ferrite was applied to a sheet and dried. The sheet was slit into tapes. The tapes were used in a recorder. Frequency of erroneous detection of a tape leader was measured after a tape was used for a long period of time. The detection characteristic was rated as ◯, Δ and x in the order of decreasing frequency of erroneous detection.

(6) Electromagnetic conversion

Magnetic recording tapes were used in a recorder and the initial head output was measured. Tapes having the same level as the reference tape were rated as ◯, those of a little lower level as Δ and those of obviously inferior level as x.

(7) Dropout

Magnetic recording tapes were tested by a dropout counter and the number of dropout was measured. The dropout characteristic was rated as ◯, Δ and x in the order of fewer occurrence of dropout.

(8) Durability

A magnetic recording tapes was run for 100 passes in a recorder and the deformation at the edge portions was visually observed. The durability was rated as ◯, Δ and x in accordance with lower degree of the edge deformation.

EXAMPLES 1 AND 2

Preparation of polyester

In a reaction vessel, 100 parts dimethyl terephthalate, 60 parts ethylene glycol and 0.09 part magnesium acetate tetrahydrate were placed. Transesterification reaction was conducted by heating while the formed methanol was being distilled off. After 4 hours, the reaction was substantially finished. To this transesterification product, 0.4 wt% silica having an average particle diameter of 30 nm, which had been dispersed in ethylene glycol, screened and filtered, 0.04 part ethylene acid phosphate and 0.035 part antimony trioxide were added and polycondensation was carried out for 4 hours. Thus polyester (A) having an intrinsic viscosity of 0.65 was obtained. Separately, polyester (B) was prepared by transesterification and polycondensation in the same manner as above except that 0.3 wt% calcium carbonate having an average particle diameter of 0.6μ was used instead of silica particles. Polyester (B) had an intrinsic viscosity of 0.65.

Preparation of films

Polyester (A) and polyester (B) were blended in the ratios indicated in Table 1 and dried. The blends were extruded at 285° C and the extruded sheets were quenched. Thus amorphous sheets were obtained. The amorphous sheets were stretched longitudinally by a factor of 3.1 at 85° C. and further stretched in the same direction by a factor of 1.6 at 76° C. Then the sheets were stretched transversely by a factor of 3.9 at 110° C. and further stretched longitudinally by a factor of 1.1 at 140° C. Finally the sheets were heat-set at 210° C. Thus 9 μm thick biaxially oriented polyester films were obtained.

On one side of the thus obtained films, a 4 μm thick magnetic layer containing barium ferrite as a magnetic material was formed. On the other side, a 0.5 μm thick back coat layer was formed using a urethane resin binder. Thus magnetic recording media having a total thickness of 13.5 μm were obtained. Characteristics of the thus obtained polyester base films and the resultant magnetic recording media (tapes) are shown in Table 1.

COMPARATIVE EXAMPLES 1 AND 2

Polyesters (A) and (B) were blended in the ratios indicated in Table 1 and amorphous films were obtained in the same manner as in Examples 1 and 2. The amorphous sheets were stretched longitudinally by a factor of 3.1 at 85° C. and transversely by a factor of 3.9 at 110° C. and heat-set at 210° C. Thus 9 μm thick biaxially oriented polyester films were obtained, which had substantially the same strength in the two directions. The obtained films were processed into 13.5 μm magnetic recording media (tapes) in the same manner as in Examples 1 and 2. The characteristics of the base films and the resultant magnetic recording media are shown in Table 1 together with those of Examples 1 and 2.

TABLE 1

| | Characteristics of Base Films | | | | Characteristics of Mag. Rec. Media | |
|---|---|---|---|---|---|---|
| | Cont. Ratio (Part) | | Ra | Longitud. | Electromagnetic | |
| | A | B | (μm) | $F_5$ (kg/mm$^2$) | Convers. Charac. | Durability |
| Ex. 1 | 98 | 2 | 0.007 | 18.2 | ◯ | ◯ |
| Ex. 2 | 50 | 50 | 0.015 | 17.8 | ◯-Δ | ◯ |
| Comp. Ex. 1 | 98 | 2 | 0.007 | 11.2 | ◯ | X |
| Comp. Ex. 2 | 40 | 60 | 0.017 | 10.5 | Δ | X |

TABLE 2

| | Characteristics of Base Film | | | | | | | Characteristics of Magnetic Recording Tape | | |
|---|---|---|---|---|---|---|---|---|---|---|
| | Content Ratio of Polyesters (parts of wt.) | | | Conc. of Carbon Black in Film | $T_{g\,\mu m}^{900\,nm}$ | Ra | Longitudinal $F_5$ | No. of Protrusions Higher than 0.81 μm | Detection of Optical Signals | Electro-magnetic Conversion | Dropout |
| | C | D | E | (wt %) | (%) | (μm) | (kg/mm$^2$) | (No./25 cm$^2$) | | | |
| Ex. 3 | 67 | 3 | 30 | 0.3 | 65 | 0.007 | 18.0 | 25 | ◯ | ◯ | ◯ |
| Ex. 4 | 0 | 2 | 98 | 0.2 | 77 | 0.009 | 17.9 | 15 | ◯-Δ | ◯ | ◯ |
| Ex. 5 | 67 | 3 | 30 | 0.3 | 64 | 0.008 | 11.2 | 30 | ◯ | ◯ | ◯ |
| Comp. Ex. 3 | 75 | 25 | 0 | 2.5 | 8 | 0.031 | 17.8 | 200 | ◯ | X | X |

EXAMPLES 3 AND 4

Preparation of polyester

In a reaction vessel, 100 parts dimethyl terephthalate, 70 parts ethylene glycol and 0.07 part calcium acetate monohydrate were placed. Transesterification reaction was conducted by heating the reaction mixture while the formed methanol was being distilled off. After four and a half hours, the temperature reached 230° C. and the transesterification was finished.

To this transesterification product, 0.04 part phosphoric acid and 0.035 part antimony trioxide were added and polymerization was conducted by the conventional method. That is, the reaction temperature was gradually raised to reach 280° C. while the pressure was gradually reduced until it reached 0.5 mmHg. After 4 hours, the reaction was finished and the product was obtained as chips by the conventional method. The obtained polyester had an intrinsic viscosity of 0.65 and was designated as polyester (C).

Polyester (C) and 10% carbon black particles having an average particle diameter of 15 nm were mixed and kneaded by a two screw kneader. The mixture was filtered by a filter of 1000 mesh and recovered as chips. This polyester had an intrinsic viscosity of 0.60 and was designated as polyester (D).

Separately, 100 parts dimethyl terephthalate, 60 parts ethylene glycol and 0.09 part magnesium acetate tetrahydrate were placed in a reaction vessel. The transesterification reaction was conducted by heating the reaction mixture while the formed methanol was being distilled off. After 4 hours, the reaction was substantially finished. To this reaction product, 0.3% by weight of silica particles having an average particle diameter of 30 nm, which had been dispersed in ethylene glycol, screened and collected by filtration, was added. Further, 0.04% by weight ethylene acid phosphate and 0.035 part antimony trioxide were added to the mixture and polycondensation was carried out for 4 hours. Polyester (E) having an intrinsic viscosity of 0.65 was obtained.

(Preparation of films)

Polyesters (C), (D) and (E) were blended in the ratios indicated in Table 2 and dried by the conventional method. The blends were extruded at 285° C. and quenched to form amorphous sheets. A filter of 300 mesh was used in extrusion. The amorphous sheets were stretched longitudinally by a factor of 3.1 at 85° C. and further longitudinally by a factor of 1.6 at 76° C. Then the sheets were stretched transversely by a factor of 3.9 at 110° C. and further longitudinally by a factor of 1.1 at 140° C. The sheets were finally heat-set at 210° C. and thus 9 μm thick biaxially oriented polyester films were obtained.

On these films, a 4 μm thick magnetic layer containing barium ferrite as a magnetic material was formed. On the other side, a 0.5 μm back coat layer containing 20% by weight carbon black and a urethane resin as a binder was formed, and magnetic recording media having a total thickness of 13.5 μm were obtained. The characteristics of the thus obtained polyester films and magnetic recording media (tapes) are shown in Table 2.

COMPARATIVE EXAMPLE 3

Polyesters (C), (D) and (E) of Example 3 were blended in the ratio indicated in Table 2. The blend was made into magnetic recording medium comprising a 9 μm thick base film and having a total thickness of 13.5 μm in the same manner as described in Example 3. The characteristics of the obtained base film and magnetic recording medium are shown in Table 2.

EXAMPLE 5

Polyesters (C), (D) and (E) of Example 3 were blended in the ratio indicated in Table 2 and made into an amorphous sheet in the same manner as in Example 3. The amorphous sheet was stretched longitudinally by a factor of 3.1 at 85° C., further in the same direction by a factor of 1.2 at 76° C., transversely by a factor of 3.9 at 110° C. and finally heat-set at 210° C. thus 9 μm thick biaxially oriented film was obtained. With this film, a magnetic recording film was made in the same manner as in Example 3. The characteristics of the base film and the magnetic recording medium are shown in Table 2.

We claim:

1. A polyester film suitable for a base of a high density magnetic recording medium containing barium ferrite as a magnetic recording medium and containing carbon black, in which the centerline average roughness (Ra) is not more than 0.025 μm, the $F_5$ value in the longitudinal direction is not less than 14 kg/mm$^2$, the light transmittance at a wavelength of 900 nm, when the thickness of said film is 9 μm, is not more than 80% and the number of surface protrusions, the height of which is not less than 0.81 μm, is not more than 80/25 cm$^2$.

2. A polyester film as recited in claim 1, wherein said carbon black has a particle size of not greater than 2 μm.

3. A polyester film as recited in claim 1, wherein the center line average roughness (Ra) is not greater than 0.012 μm.

4. A polyester film as recited in claim 1, wherein said $F_5$ value is not less than 17 kg/mm$^2$.

5. A polyester film as recited in claim 1 wherein the carbon black content is 0.05-2 wt%.

6. A polyester film as recited in claim 5, wherein the amount of said carbon black ranges from 0.1-0.7 wt.%.

7. A polyester film as recited in claim 1, wherein the film contains inert fine particles in an amount ranging from 0.005 to 2% by weight.

8. A polyester film as recited in claim 5, wherein said fine particles have a mean particle size ranging from 0.05-50 μm.

* * * * *